US012325253B2

(12) United States Patent
Trassl

(10) Patent No.: US 12,325,253 B2
(45) Date of Patent: Jun. 10, 2025

(54) SECURING ELEMENT WITH A SUBSTRATE AND AT LEAST ONE MICRO-IMAGE ASSEMBLY

(71) Applicant: Hueck Folien Gesellschaft m.b.H., Baumgartenberg (AT)

(72) Inventor: Stephan Trassl, Baumgartenberg (AT)

(73) Assignee: Hueck Folien Gesellschaft m.b.H., Baumgartenberg (AT)

( * ) Notice: Subject to any disclaimer, the term of this patent is extended or adjusted under 35 U.S.C. 154(b) by 0 days.

(21) Appl. No.: 18/573,184

(22) PCT Filed: Jun. 23, 2022

(86) PCT No.: PCT/EP2022/067190
§ 371 (c)(1),
(2) Date: Dec. 21, 2023

(87) PCT Pub. No.: WO2022/268962
PCT Pub. Date: Dec. 29, 2022

(65) Prior Publication Data
US 2024/0294028 A1 Sep. 5, 2024

(30) Foreign Application Priority Data
Jun. 23, 2021 (EP) .................................... 21181145

(51) Int. Cl.
*B42D 25/324* (2014.01)
*B42D 25/36* (2014.01)
*B42D 25/364* (2014.01)
*B42D 25/373* (2014.01)

(52) U.S. Cl.
CPC ......... *B42D 25/324* (2014.10); *B42D 25/364* (2014.10); *B42D 25/373* (2014.10)

(58) Field of Classification Search
CPC .... B42D 25/364; B42D 25/324; B42D 25/36; B42D 25/373
USPC ....................... 283/72, 94, 98, 109, 110, 901
See application file for complete search history.

(56) References Cited

U.S. PATENT DOCUMENTS

2015/0198749 A1* 7/2015 Ye ........................... G02B 5/18
359/581

FOREIGN PATENT DOCUMENTS

| | | | |
|---|---|---|---|
| CN | 205416817 | U | 8/2016 |
| FR | 3002183 | A1 | 8/2014 |
| WO | 2011116425 | A1 | 9/2011 |

(Continued)

OTHER PUBLICATIONS

International Search Report of International Application PCT/EP2022/067190, dated Oct. 20, 2022, 2 pages.

*Primary Examiner* — Justin V Lewis
(74) *Attorney, Agent, or Firm* — FisherBroyles, LLP

(57) ABSTRACT

A security element with a substrate and at least one micro-image arrangement, as well as at least one focusing layer interacting with the micro-image arrangement having an arrangement of focusing elements, wherein the at least one micro-image arrangement comprises at least one relief structure, wherein the micro-image arrangement generates a visible optical effect when viewed through the focusing layer, wherein the at least one micro-image arrangement comprises at least one color-shifting layer arranged on the at least one relief structure with a color-shifting effect discernible through the focusing layer.

16 Claims, 2 Drawing Sheets

(56) References Cited

FOREIGN PATENT DOCUMENTS

WO 2016016638 A1 2/2016

* cited by examiner

SECURING ELEMENT WITH A SUBSTRATE AND AT LEAST ONE MICRO-IMAGE ASSEMBLY

CROSS-REFERENCE TO RELATED APPLICATIONS

Figure 1:
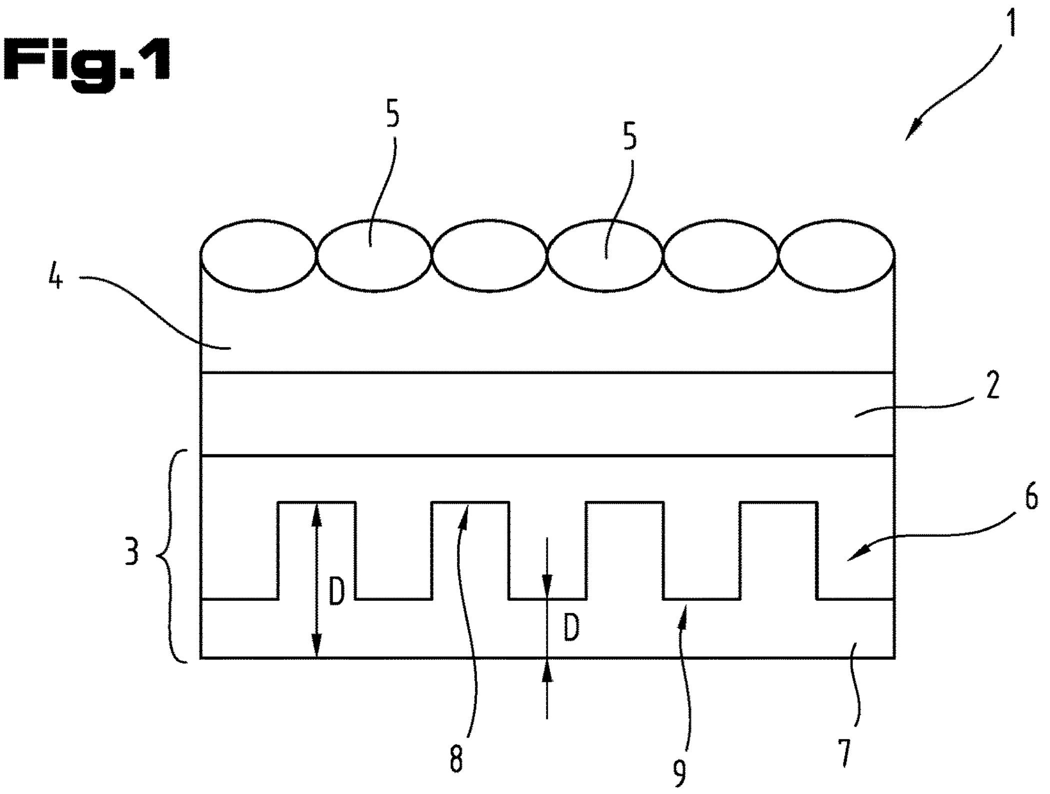

This application is a U.S. National Phase based on, and claiming priority to, PCT/EP2022/067190, filed on Jun. 23, 2022 entitled "SECURING ELEMENT WITH A SUBSTRATE AND AT LEAST ONE MICRO-IMAGE ASSEMBLY", which based on and claims priority to European Patent Application No. 21181145.0, filed on Jun. 23, 2021, each of which is hereby incorporated by reference in it's entirety.

The invention relates to a security element with a substrate and at least one micro-image arrangement, as well as at least one focusing layer interacting with the micro-image arrangement having an arrangement of focusing elements, wherein the at least one micro-image arrangement comprises at least one relief structure, wherein the micro-image arrangement generates a visible optical effect when viewed through the focusing layer.

Such security elements are commonly used to enhance protection against counterfeiting valuable documents and security papers such as bank notes, identity documents, credit cards, ATM cards, tickets, etc.

Security elements of the aforementioned type are known from WO2011116425A1 and WO2016016638A1. A viewer can observe an image arrangement located in a focal length range of the focusing layer when looking through the focusing layer.

Based on this prior art, the underlying object of the present invention is to enhance protection against counterfeiting the known security elements.

This object is achieved according to the invention with a security element of the type described at the beginning, in that the at least one micro-image arrangement comprises at least one colour-shifting layer arranged on the at least one relief structure with a colour-shifting effect, which can be seen through the focusing layer.

The solution according to the invention enables the micro-image arrangement to become discernible only in interaction with the focusing elements and, without the focusing elements, only the colour-shifting layer would be perceptible as a uniform layer with a uniform colour impression. When the micro-image arrangement is viewed through the focusing layer, a viewing-angle-dependent colour impression of the micro-image also occurs. The invention makes possible the creation of a security element that is very difficult to forge. The solution according to the invention also enables a high degree of customisability and a wide variety of configuration options, an additional effect thereof being a significant enhancement in protection against counterfeiting.

At this point, it should be noted that the phrase "a layer is applied (on)to something" is to be understood such that the layer can be applied directly, or that another or more intermediate layers can be located between the applied layer and that to which the layer is applied. It is worth noting here that one or more intermediate layers can be arranged between the layers described in this document. It is therefore not absolutely necessary for the layers described to contact each other. It should further be noted that the term layer in this document is to be understood such that a layer can be composed of only a single layer or also of several sub-layers.

The substrate preferably has a thickness of between 5-700 μm, preferably 5-200 μm, particularly preferably 5-125 μm, in particular 10-75 μm.

According to an advantageous variant of the invention, it can be provided that the focusing elements are configured as microlenses, in particular as microlenses embossed in an embossing lacquer layer. The embossing lacquer layer with the microlenses formed therein can have a thickness of 0.1 μm to 300 μm, in particular 0.1 μm to 50 μm, for example.

Alternatively, the focusing elements configured as microlenses can also be formed from a thermoplastic material. What is known as the reflow method can be used for this purpose. This technique comprises the following steps: defining an island-shaped structure in or with a thermoplastic material, for example a resin, e.g. by photolithography in a photosensitive, resin-like photoresist or applying the material to a substrate, for example by means of printing and subsequently heating the material. Before melting, the surface tension pulls the island of material into a spherical cap with a volume corresponding to that of the original island, thereby forming a microlens.

According to an advantageous embodiment of the invention, it can be provided that the relief structure of the micro-image arrangement is embossed in an embossing lacquer layer. The embossed lacquer layer with the relief structures formed therein can have a thickness of 0.1 μm to 300 μm, in particular 0.1 μm to 50 μm, for example. Furthermore, the structures of the micro-image arrangement can also be produced by means of what is known as a "microcontact printing" process. Microcontact printing is a transfer process, in which an already cured and structured UV varnish is transferred. A printing tool with depressions filled with UV varnish similar to that used in gravure cylinders can be used in this process. When the printing tool/cylinder comes into contact with a film, for example the substrate, the UV varnish is cured and the filled depression transferred to the film. At this point, it is quite generally noted that, regardless of the way in which the micro-image arrangement is generated, it is only important that the micro-image arrangement has a height profile.

It is particularly preferred for the micro-image arrangement to be magnified when viewed through the arrangement of focusing elements of the focusing layer. However, it is not necessary for a micro-image to be located under each lens as can be the case with moiré lenses, for example, but it is also possible for only parts of an image to be located under a lens or a focusing element and for a macroscopic image to be constructed by the magnification and interaction of the lenses. Furthermore, the focusing elements do not necessarily result in magnification. Thus, the light refraction of the focusing elements alone can also be used to represent an image sequence by shifting, wherein an image sequence can be defined by interlaced micro-images. In this case, the focusing elements and the micro-image arrangement can generate a lenticular image ("lenticular raster image").

A very good, in particular colour, contrast of the micro-image arrangement and significantly improved perceptibility thereof can be achieved by the structures of the micro-image arrangements influencing particularly the thickness of the colour-shifting layer and particularly the spacing layer for thin-film structures, resulting in a colour change of the colour-shifting layer varying exactly with the structure.

Furthermore, the micro-image arrangement can also be formed in a liquid-crystal layer. In this case, the liquid-crystal layer can be applied to the substrate and the micro-image arrangement embossed in the liquid-crystal layer. In addition, a colour-shifting-effect enhancing layer can be applied to the liquid-crystal layer. When a liquid-crystal layer is used to form the micro-image arrangement, the colour-effect-enhancing layer enables enhancement of the colour-shifting effect. The colour-shifting-effect enhancing layer can be an opaque layer, in particular a dark or black-coloured layer, a metallic layer, etc., for example.

According to a preferred advancement, it can be provided that a layer thickness of the at least one colour-shifting layer varies, wherein on at least one first surface portion of the at least one relief structure closer to the substrate than a second surface portion, the layer thickness of the at least one colour-shifting layer differs from the layer thickness of the colour-shifting layer on the at least one second surface portion of the relief.

It can further be provided that the layer thickness of the colour-shifting layer on the first surface portion is greater than in the second surface portion or vice versa.

It is preferably provided that, when viewed through the at least one focusing layer, an optical impression generated by the colour-shifting layer and at least one first surface portion is different from an optical impression generated by the colour-shifting layer and the second surface portion, the optical impression preferably being a colour impression.

According to a preferred embodiment of the invention, provision is made for the at least one focusing layer to be arranged on a first side of the substrate and the at least one micro-image arrangement on a side opposite the first side of the substrate so that the substrate is arranged between the at least one micro-image arrangement and the at least one focusing layer.

It can further be provided that the at least one image arrangement and the at least one focusing layer are arranged on the same side of the substrate and the at least one micro-image arrangement is positioned between the substrate and the focusing layer.

It has proven to be particularly advantageous for the at least one colour-shifting layer to have a colour-shifting, thin-film structure or colour-shifting pigments, in particular interference pigments or at least one liquid-crystal layer, in particular a liquid-crystal layer and at least one layer that enhances the colour-shifting effect. When using colour-shifting pigments or a liquid-crystal layer, for example, the colour-effect-enhancing layer can achieve enhancements in the colour-shifting effect. From the point of view of the user, the colour-effect-enhancing layer is positioned behind the colour-shifting pigments or the liquid-crystal layer in this case. The colour-shifting-effect enhancing layer can be an opaque layer, in particular a dark or black-coloured layer, a metallic layer, etc., for example. An example of a layer that enhances the colour-shifting effect, as can be used within the scope of the present invention, is the black coating as per the subject matter of EP1522606B1, for example.

According to a variant of the invention, the colour-shifting thin-film structure can have at least one absorber layer and at least one spacing layer made of a dielectric material, wherein the absorber layer of the colour-shifting thin-film structure is preferably closer to the focusing layer than the spacing layer.

The thin-film structure advantageously has at least one reflection layer, the spacing layer being arranged between the reflection layer and the absorber layer.

The at least one absorber layer can comprise at least one metallic material, in particular selected from the group nickel, titanium, vanadium, chromium, cobalt, palladium, iron, tungsten, molybdenum, niobium, aluminium, silver, copper and/or alloys of these materials, or can be manufactured from at least one of these materials.

The at least one spacing layer can comprise or be manufactured from at least one low-refractive dielectric material with a refractive index less than or equal to 1.65, in particular selected from the group aluminium oxide ($Al_2O_3$), metal fluorides, for example magnesium fluoride ($MgF_2$), aluminium fluoride ($AlF_3$), silicon oxide ($SIO_x$), silicon dioxide ($SiO_2$), cerium fluoride ($CeF_3$), sodium aluminium fluorides (e.g. $Na_3AlF_6$ or $Na_3Al_3F_{14}$), neodymium fluoride ($NdF_3$), lanthanum fluoride ($LaF_3$), samarium fluoride ($SmF_3$), barium fluoride ($BaF_2$), calcium fluoride ($CaF_2$), lithium fluoride (LiF), low-refractive organic monomers and/or low-refractive organic polymers or at least one high-refractive dielectric material with a refractive index greater than 1.65, in particular selected from the group zinc sulphide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($YO_2O_3$), curopium oxide ($Eu_2O_3$), iron oxides such as iron (II, III) oxide ($Fe_3O_4$), and iron (III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), high-refractive organic monomers and/or high-refractive organic polymers.

According to a preferred variant of the invention, the relief structure of the micro-image arrangement can be formed in the spacing layer, in particular embossed in the spacing layer. It is particularly advantageous for the spacing layer to be formed from a polymeric material for this purpose.

Furthermore, the at least one reflection layer can comprise or be manufactured from at least one metallic material selected in particular from the group silver, copper, aluminium, gold, platinum, niobium, tin or from nickel, titanium, vanadium, chromium, cobalt and palladium or alloys of these materials, in particular cobalt-nickel alloys or at least one high-refractive dielectric material with a refractive index greater than 1.65, in particular selected from the group of zinc sulphide (ZnS), zinc oxide (ZnO), titanium dioxide ($TiO_2$), carbon (C), indium oxide ($In_2O_3$), indium-tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron(II,III)oxide ($Fe_3O_4$) and iron(III)oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), for example, high-refractive organic monomers and/or high-refractive organic polymers of these materials.

Furthermore, it can be provided that the substrate is made of plastic, in particular of a translucent and/or thermoplastic material, wherein the substrate (2) preferably comprises or is manufactured from at least one of the materials from the group polyimide (PI), polypropylene (PP), monoaxially oriented polypropylene (MOPP), biaxially oriented polypropylene (BOPP), polyethylene (PE), polyphenylene sulphide (PPS), polyether ether ketone (PEEK), polyether ketone (PEK), polyethylene imide (PEI), polysulfone (PSU), polyaryl ether ketone (PAEK), polyethylene naphthalate (PEN), liquid-crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile butadiene styrene (ABS), polyvinyl chloride (PVC), ethylene tetrafluoroethylene (ETFE), polytetrafluoroethylene (PTFE), polyvinyl fluoride (PVF), polyvinylidene fluoride (PVDF) and ethylene tetrafluoroethylene hexafluoropropylene polymer (EFEP) and/or mixtures of these materials.

According to an advantageous embodiment of the invention, which enables further improvement of counterfeit protection, it can be provided that a micro-image represented by the micro-image arrangement appears as a light-dark contrast when viewed in transmitted light from the side on which the focusing layer is located.

According to a further advancement, it is possible for the security element to be provided with machine-readable features, said machine-readable features in particular being magnetic codes, electrically conductive layers, materials that absorb and/or re-emit electromagnetic waves.

It can further be expedient for the security element to have additional layers, said additional layers particularly comprising protective lacquers, heat-sealing lacquers, adhesives, primers and/or films.

The figures below elaborate on the invention to offer better understanding thereof.

Figure 2:
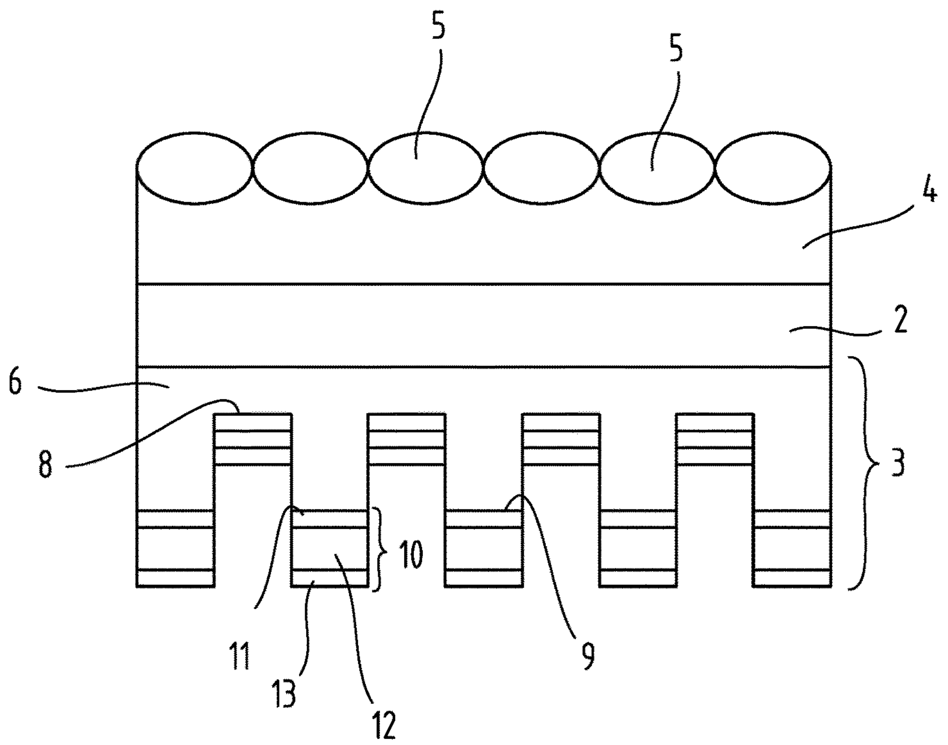
Figure 3:
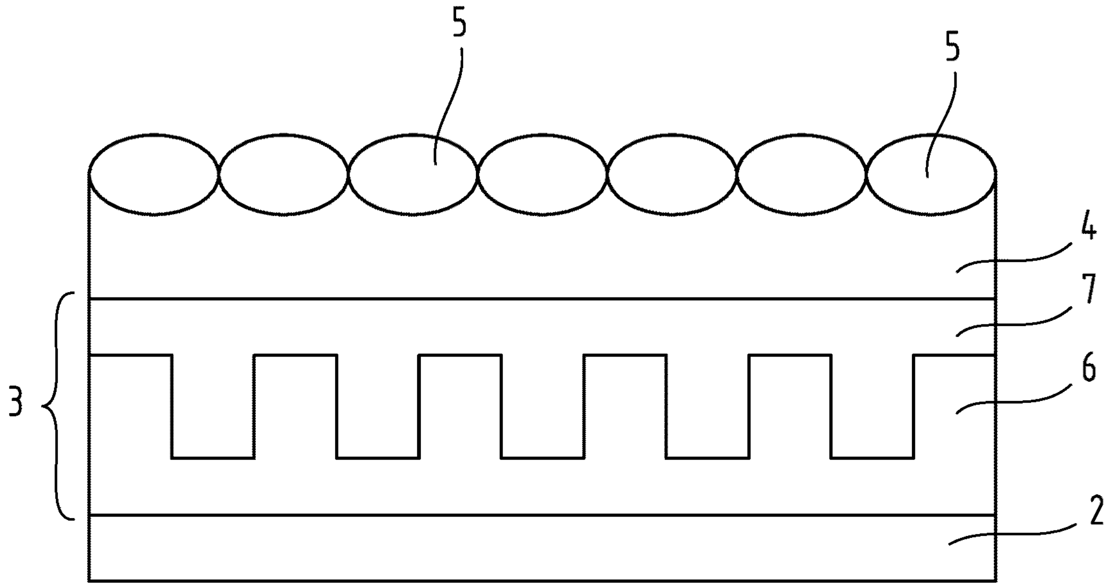

The figures show in greatly simplified, schematic depiction:

FIG. 1 a first variant of a security element according to the invention;

FIG. 2 a second variant of a security element according to the invention and FIG. 3 a third variant of a security element according to the invention.

It is worth noting here that the same parts have been given the same reference numerals or same component designations in the embodiments described differently, yet the disclosures contained throughout the entire description can be applied analogously to the same parts with the same reference numerals or the same component designations. The indications of position selected in the description, such as above, below, on the side etc. refer to the figure directly described and shown, and these indications of position can be applied in the same way to the new position should the position change.

All value ranges specified in the current description are to be understood such that they include any and all sub-ranges, e.g., the specification 1 to 10 is to be understood such that all sub-ranges, starting from the lower limit 1 and the upper limit 10 are included, i.e., all sub-ranges begin with a lower limit of 1 or more and end at an upper limit of 10 or less, e.g., 1 to 1.7, or 3.2 to 8.1, or 5.5 to 10.

The term "in particular/particularly" is understood in the following to be a possible, more specific configuration or further specification of subject matter or a method step but not necessarily to mean a mandatory, preferred embodiment of the same or a mandatory procedure.

Furthermore, the term "layer" is used both for a single layer and for a multi-layer, interconnected component composite. Each of the layers described below can therefore also comprise a plurality of layers, preferably connected to one another or adhering to one another.

In order to avoid unnecessary repetition, FIGS. 1 to 3 are described at least summarily in part.

According to FIG. 1, a security element 1 has a substrate 2. The substrate 2 can be made of plastic, in particular a translucent and/or thermoplastic material.

The substrate 2 preferably comprises or is manufactured from one of the materials from the group polyimide (PI), polypropylene (PP), monoaxially oriented polypropylene (MOP), biaxially oriented polypropylene (BOPP), polyethylene (PE), polyphenylene sulphide (PPS), polyether ether ketone, (PEEK) polyether ketone (PEK), polyethyleneimide (PEI), polysulfone (PSU), polyaryl ether ketone (PAEK), polyethylene naphthalate (PEN), liquid-crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile butadiene styrene (ABS), polyvinyl chloride (PVC), ethylene tetrafluoroethylene (ETFE), polytetrafluoroethylene (PTFE), polyvinyl fluoride (PVF), polyvinylidene fluoride (PVDF) and ethylene tetrafluoroethylene hexafluoropropylene fluoroterpolymer (EFEP) and/or mixtures and/or copolymers of these materials. The substrate 2 preferably has a thickness between 5-700 μm, preferably 5-200 μm, particularly preferably 5-125 μm, in particular 10-75 μm.

A micro-image arrangement 3 and at least one focusing layer 4 interacting with the micro-image arrangement 3 are located on the substrate 2. The focusing layer 4 comprises an arrangement of focusing elements 5. The focusing elements 5 are preferably configured as microlenses. The focusing elements 5 are preferably realized as microlenses formed in an embossing lacquer layer located on the substrate 2. The embossing lacquer layer with the microlenses of the focusing layer 5 formed therein can preferably have a thickness of 0.1 μm to 300 μm, in particular 0.1 μm to 50 μm.

Alternatively, the focusing elements 5 configured as microlenses can also be formed from a thermoplastic material. What is known as the reflow method can be used for this purpose. This technique comprises the following steps: defining an island-shaped structure in or with a thermoplastic material, for example a resin, e.g. by photolithography in a photosensitive, resin-like photoresist or applying the material to a substrate, for example by means of printing and subsequently heating the material. Before melting, the surface tension pulls the island of material into a spherical cap with a volume corresponding to that of the original island, thereby forming a microlens. However, it is not necessary for a micro-image to be located under each lens, as can be the case with moiré lenses, for example, but it is also possible for only parts of an image to be located under a lens or a focusing element 5 and for a macroscopic image to be constructed by the magnification and interaction of the lenses. Furthermore, the focusing elements do not necessarily result in magnification. Thus, the light refraction of the focusing elements alone can also be used to represent an image sequence by shifting, wherein an image sequence can be defined by interlaced micro-images. In this case, the focusing elements 5 and the micro-image arrangement 3 can generate a lenticular image ("lenticular raster image").

The micro-image arrangement 3 comprises a relief structure 6, which can also preferably be embossed in an embossing lacquer layer located on the substrate 2. The embossing lacquer layer with the relief structure 6 of the micro-image arrangement 3 formed therein can preferably have a thickness of 0.1 μm to 300 μm, in particular from 0.18 μm to 50 μm. Alternatively, the relief structure 6 of the micro-image arrangement 3 can also be produced by means of what is known as a "microcontact printing" process. Microcontact printing is understood particularly as a transfer process, in which an already cured and structured UV varnish is transferred. A printing tool with depressions that are filled with UV varnish similar to what is used in gravure cylinders can be used in this process. When the cylinder comes into contact with a film, for example the substrate, the UV varnish is cured and the filled depression transferred to the film.

Regardless of the way in which the micro-image arrangement is generated, it is only important that the micro-image arrangement has a height profile.

The relief structures 6 of the micro-image arrangement 3 can comprise or be configured as, for example, embossments in the form of a motif, in particular diffractive embossments and/or micromirrors, in particular with lateral dimensions of 5-10 μm, anti-reflection embossments with periodic or non-periodic lattices, e.g. microstructures with (pseudo)periodic, for example conical or sinusoidal in structure or sub-wavelength structures as described in DE 10 2012 015 900 A1, for example.

Furthermore, the relief structure 6 of the micro-image arrangement 3 can also be formed in a liquid-crystal layer. In this case, the liquid-crystal layer can be applied to the substrate 2 and the micro-image arrangement 3 embossed in the liquid-crystal layer.

However, the relief structure 6 of the micro-image arrangement 3 can also be introduced, in particular embossed, into a spacing layer 12 of a thin-film element 10 as described below.

For the production of the micro-image arrangement 3, it is particularly important for the micro-image arrangement 3 to have a corresponding relief structure 6 and thus a height profile.

In addition, a colour-shifting-effect enhancing layer can be applied when a liquid-crystal layer is used. When a liquid-crystal layer is used to form the micro-image arrangement 3, the colour-effect-enhancing layer enables enhancement of the colour-shifting effect. The colour-shifting-effect enhancing layer can be an opaque layer, in particular a dark or black-coloured layer, a metallic layer, etc., for example. Using a liquid-crystal layer to produce the micro-image arrangement can result in the layer sequence focusing layer 4-substrate 2-liquid-crystal layer-absorber or the colour-shifting-effect enhancing layer.

When viewed through the focusing layer 4, the micro-image arrangement 3 produces a visible optical effect, for example in the form of an image with a colour impression dependent on a viewing angle. The micro-image arrangement 3 further comprises a colour-shifting layer 7 arranged on the at least one relief structure 6 with a colour-shifting effect discernible through the focusing layer 4.

A distance between the focusing elements 5 and the micro-image arrangement 3 can substantially correspond to the focal length of the focusing elements 5 or can also be greater or smaller.

It is preferred for the micro-image arrangement 3 to be magnified when viewed through the arrangement of focusing elements 5 of the focusing layer 4. If the relief structure 6 represents a pattern, character, motif, etc. that periodically repeats in the micro-image arrangement and the focusing elements 5 have a similar repeating period, an enlarged overall image formed from moiré rings, each of which represents an enlargement of the pattern, character or motif, is generated.

As can further be seen in FIG. 1-3, a layer thickness of the colour-shifting layer 7 can vary. In this case, the layer thickness of the colour-shifting layer on a first surface portion 8 of the relief structure 6 differs from the layer thickness on a second surface portion 9 of the relief structure 6. A distance between the surface portion 8 of the relief structure 6 and the substrate 2 is smaller than a distance between the surface portion 9 of the relief structure 6 and the substrate 2 in this case. The layer thickness of the colour-shifting layer 7 on the first surface portion 8 can be greater than in the second surface portion 9 or vice versa, for example. In addition to other methods, it is possible to use, for example, washing methods that are known per se to produce different layer thicknesses of the layer 7, in which applying washing colours and applying material to structure the layer 7 is carried out in succession followed by washing steps. Furthermore or additionally, applying material to structure the layer 7 can also be carried out by means of PVD methods, spraying, printing, etc., for example.

When viewed through the focusing layer 4, a first optical impression generated by the colour-shifting layer 7 and the first surface portion 8 is different from an optical impression generated by the colour-shifting layer 7 and the second surface portion 9. The first and second visual impressions preferably show a colour or brightness impression. When using thin-film structures 10, the thickness of a spacing layer 12 in particular can vary, resulting in locally different colour impressions being achievable, for example.

According to FIGS. 1 and 2, the focusing layer 4 can be arranged on a first side of the substrate 2 and the micro-image arrangement 3 on one of the sides opposite the first side of the substrate 2. In this case, the substrate 2 is located between the micro-image arrangement 3 and the focusing layer 4. When viewed from the side on which the focusing layer 4 is applied, the micro-image arrangement 3 appears through the focusing layer and through the substrate 2, which in this case is transparent.

However, it is alternatively also possible for the at least one micro-image arrangement 3 and the focusing layer 4 to be arranged on the same side of the substrate 2 and the at least one micro-image arrangement 3 to be positioned between the substrate and the focusing layer 4, as depicted in FIG. 3. In the embodiment shown in FIG. 3, it is not necessary for the substrate 2 to be transparent or to allow a view of a layer behind it.

The colour-shifting layer 7 can have colour-shifting pigments, in particular interference pigments, at least one liquid-crystal layer, in particular one liquid-crystal layer as well as at least one layer that enhances the colour-shifting effect or, as depicted in FIG. 2, a colour-shifting thin-layer structure 10.

When using colour-shifting pigments or a liquid-crystal layer, for example, the colour-effect-enhancing layer can achieve enhancements in the colour-shifting effect. From the point of view of the user, the colour-effect-enhancing layer is positioned behind the colour-shifting pigments or the liquid-crystal layer in this case. The colour-shifting-effect enhancing layer can be an opaque layer, in particular a dark or black-coloured layer, a metallic layer, etc., for example.

Using a liquid-crystal layer to coat the relief structure 6 of the micro-image arrangement 3 can lead to the following layer sequence:

Focusing layer 4-substrate 2-relief structures 6-liquid-crystal layer-absorber or the colour-shifting-effect enhancing layer.

The liquid-crystal layer in the form of a liquid-crystal lacquer, for example, can be applied directly to the relief structures 6, for example embossed in an embossing lacquer or produced differently as described above. On the one hand, the embossments or relief structures 6 serve to align the liquid crystals and, on the other hand, to achieve the desired effect here. The colour-shifting thin-film structure 10 has at least one absorber layer 11 and a spacing layer 12 made of a dielectric material. In this case, the absorber layer 11 of the colour-shifting thin-film structure 10 is preferably closer to the focusing layer 4 than the spacing layer 12 in order to clearly discern the colour-shifting effect when viewing through the focusing layer 4. The absorber layer 11 can comprise a metallic material, in particular selected from the group nickel, titanium, vanadium, chromium, cobalt, palladium, iron, tungsten, molybdenum, niobium, aluminium, silver, copper and/or alloys of these materials, or can be manufactured from at least one of these materials.

The spacing layer 12 can comprise or be manufactured from at least one low-refractive dielectric material with a refractive index less than or equal to 1.65 in particular selected from the group aluminium oxide ($Al_2O_3$), metal fluorides, for example magnesium fluoride ($MgF_2$), aluminium fluoride ($AlF_3$), silicon oxide ($SIO_x$), silicon dioxide ($SiO_2$), cerium fluoride ($CeF_3$), sodium aluminium fluorides (e.g. $Na_3AlF_6$ or $Na_3Al_3F_{14}$), neodymium fluoride ($NdF_3$), lanthanum fluoride ($LaF_3$), samarium fluoride ($SmF_3$), barium fluoride ($BaF_2$), calcium fluoride ($CaF_2$), lithium fluoride (LiF), low-refractive organic monomers and/or low-refractive organic polymers or at least one high-refractive dielectric material with a refractive index greater than 1.65 in particular selected from the group zinc sulphide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($YO_2O_3$), europium oxide ($Eu_2O_3$), iron oxides such as iron (II, III) oxide ($Fe_3O_4$), and iron (III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), prascodymium oxide ($Pr_6O_{11}$), samarium oxide ($Sm_2O_3$), antimony trioxide ($Sb_2O_3$), silicon carbide (SiC), silicon nitride ($Si_3N_4$), Silicon monoxide (SiO), selenium trioxide ($Se_2O_3$), tin oxide ($SnO_2$), tungsten trioxide ($WO_3$), high-refractive organic monomers and/or high-refractive organic polymers To enhance the colour-shifting effect, the thin-film structure 10 can have a reflection layer 13. In this case, the spacing layer 12 is arranged between the reflection layer 13 and the absorber layer 11.

The reflection layer 13 can comprise or be manufactured from at least one or more metallic material selected in particular from the group silver, copper, aluminium, gold, platinum, niobium, tin or from nickel, titanium, vanadium, chromium, cobalt and palladium or alloys of these materials, in particular cobalt-nickel alloys or at least one high-refractive dielectric material with a refractive index greater than 1.65 in particular selected from the group zinc sulphide (ZnS), zinc oxide (ZnO), titanium dioxide ($TiO_2$), carbon (C), indium oxide ($In_2O_3$), indium-tin oxide (ITO), tantalum pentoxide ($Ta_2O_5$), cerium oxide ($CeO_2$), yttrium oxide ($Y_2O_3$), curopium oxide ($Eu_2O_3$), iron oxides such as iron (II,III)oxide ($Fe_3O_4$) and iron(III)oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), prascodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), for example, high-refractive organic monomers and/or high-refractive organic polymers of these materials.

The relief structure 6 of the micro-image arrangement 3 can be formed in the spacing layer 12, in particular embossed in the spacing layer 12. Though not absolutely necessary, it is advantageous for the spacing layer 12 to be formed from a polymeric material for this purpose.

If the relief structure 6 is formed in the spacing layer 12, the following layer sequence can result: focusing layer 4-substrate 2-absorber layer 11-spacing layer 12 with relief structures 6 formed therein-reflection layer 13.

After the spacing layer 12 has been applied to the absorber layer 11, the relief structure 6 can be embossed in the spacing layer 12 for example, and the reflection layer 13 can then optionally be applied to the spacing layer 12.

The layer structure shown in FIG. 2 can be achieved by applying the absorber layer 11 in a first step, for example. Then the spacing layer 12 until this has a predetermined layer thickness in a region of the surface portion 8. Washing colour can then be applied to the spacing layer 12 in the region of the surface portion 8. However, no washing colour is applied to the surface portion 9. Additional material for the spacing layer 12 is applied hereupon. By washing out the washing colour, the additional spacing layer 12 applied remains only in the region of the surface portion 9. The additional material for the spacing layer is removed along with the washing colour in the region of the surface portion 8. The method mentioned above in this paragraph is to be understood merely as a possible example of producing different layer thicknesses of the colour-shifting layer 7. Of course, other methods such as, for example, PVD methods, spraying methods, etc., can alternatively or additionally be used to produce different layer thicknesses of the colour-shifting layer 7.

According to an advancement of the invention, the thin-film structure 10 viewed from the side of the focusing layer 4, for example, can appear colour-shifting in incident light and rather opaque in transmitted light. In this case, the reflection layer 13 follows the embossed relief structure 6 and has locally different thickness depending on the relief structure 6. Therefore, the reflection layer 13 is thinner in some areas than in other areas corresponding to the embossments. In transmitted light, a contrast can then be seen from the side of the focusing layer 4 and/or from a side of the security element 1 opposite the focusing layer 4 between points of the reflection layer 13 with lower layer thickness and points of the reflection layer 13 with comparatively greater layer thickness, and thus a micro-image generated by the micro-image arrangement 2. However, this micro-image is not seen as colour-shifting in transmitted light but as a light-dark contrast.

Even when using a liquid-crystal layer and an enhancing layer, the enhancing layer, for example a black metallization, follows the embossed relief structure 6 and can have locally differing layer thicknesses corresponding to the embossed relief structure 6, so that the same effect as described in the paragraph above in in relation to the thin-film structure 10 could also be produced here.

As already mentioned above, the relief structures 6 of the micro-image arrangement 3, for example embossments, can be present in the form of a motif.

Quite generally, the embossments can be embossments in the form of height profiles, diffractive embossments and/or micromirrors, in particular with lateral dimensions of 5-10 μm, anti-reflection embossments with periodic or non-periodic lattices, e.g. microstructures with (pseudo)periodic, for example conical or sinusoidal in structure, or sub-wavelength structures as described in DE 10 2012 015 900 A1, for example. Furthermore, the security element can be provided with machine-readable features, said machine-readable features in particular being magnetic codes, electrically conductive layers, materials that absorb and/or re-emit electromagnetic waves. It can further be expedient for the security element to have additional layers, said additional layers particularly comprising protective lacquers, heat-sealing lacquers, adhesives, primers and/or films. It is noted that the colour-shifting layer 7 can be configured both with its entire area and also partially in all exemplary embodiments.

As a matter of form and by way of conclusion, it is noted that, to improve understanding of the structure, elements have partially not been shown to scale and/or enlarged and/or shrunk.

LIST OF REFERENCE NUMERALS

1 Security element
2 Substrate
3 Micro-image arrangement
4 Focusing layer
5 Focusing elements
6 Relief structure
7 Layer
8 Surface portion
9 Surface portion
10 Thin-film structure
11 Absorber layer
12 Spacing layer
13 Reflection layer

The invention claimed is:

1. A security element with a substrate and at least one micro-image arrangement, as well as at least one focusing layer interacting with the micro-image arrangement, the focusing layer having an arrangement of focusing elements, wherein the at least one micro-image arrangement comprises at least one relief structure, wherein the micro-image arrangement generates a visible optical effect when viewed through the focusing layer, characterized in that the at least one micro-image arrangement comprises at least one color-shifting layer arranged on the at least one relief structure with a color-shifting effect discernible through the focusing layer, wherein the at least one micro-image arrangement and the at least one focusing layer are arranged on a same side of the substrate and the at least one micro-image arrangement is between the substrate and the focusing layer.

2. The security element according to claim 1, characterized in that the focusing elements are configured as one of microlenses embossed in an embossing lacquer layer, or as microlenses formed by a thermoplastic material, or as microlenses manufactured by a reflow method.

3. The security element according to claim 1, characterized in that the micro-image arrangement is magnified when viewed through the arrangement of focusing elements of the focusing layer.

4. The security element according to claim 1, characterized in that a layer thickness of the at least one color-shifting layer varies, wherein on at least one first surface portion of the at least one relief structure the layer thickness of the at least one color-shifting layer differs from the layer thickness of the color-shifting layer on at least one second surface portion of the relief structure, wherein the at least one first surface portion is closer to the substrate than the at least one second surface portion.

5. The security element according to claim 4, characterized in that the layer thickness of the color-shifting layer on the first surface portion is greater than in the second surface portion.

6. The security element according to claim 4, characterized in that, when viewed through the at least one focusing layer, an optical impression generated by the color-shifting layer and at least one first surface portion is different from an optical impression generated by the color-shifting layer and the second surface portion, wherein the optical impression is a color impression.

7. The security element according to claim 1, characterized in that the at least one focusing layer is arranged on a first side of the substrate and the at least one micro-image arrangement on a side opposite the first side of the substrate so that the substrate is arranged between the at least one micro-image arrangement and the at least one focusing layer.

8. A security element with a substrate and at least one micro-image arrangement, as well as at least one focusing layer interacting with the micro-image arrangement, the focusing layer having an arrangement of focusing elements, wherein the at least one micro-image arrangement comprises at least one relief structure, wherein the micro-image arrangement generates a visible optical effect when viewed through the focusing layer, characterized in that the at least one micro-image arrangement comprises at least one color-shifting layer arranged on the at least one relief structure with a color-shifting effect discernible through the focusing layer wherein the at least one color-shifting layer has a color-shifting, thin-film structure or color-shifting pigments or at least one liquid-crystal layer and at least one layer that enhances the color-shifting effect.

9. The security element according to claim 8, characterized in that the color-shifting thin-film structure has at least one absorber layer and at least one spacing layer made of a dielectric material, wherein the absorber layer of the color-shifting thin-film structure is between the focusing layer than the spacing layer.

10. The security element according to claim 9, characterized in that the relief structure of the micro-image arrangement is formed in the spacing layer.

11. The security element according to claim 9, characterized in that the at least one absorber layer comprises at least one metallic material, the metallic material may be selected from the group of nickel, titanium, vanadium, chromium, cobalt, palladium, iron, tungsten, molybdenum, niobium, aluminium, silver, copper and/or alloys of these materials, or can be manufactured from at least one of these materials.

12. The security element according to claim 9, characterized in that at least one spacing layer comprises or is manufactured from:

at least one low-refractive dielectric material with a refractive index less than or equal to 1.65, the spacing layer is selected from the group aluminium oxide ($Al_2O_3$), metal fluorides, magnesium fluoride ($MgF_2$), aluminium fluoride ($AlF_3$), silicon oxide ($SIO_x$), silicon dioxide ($SiO_2$), cerium fluoride ($CeF_3$), sodium aluminium fluorides (e.g. $Na_3AlF_6$ or $Na_5Al_3F_{14}$), neodymium fluoride ($NdF_3$), lanthanum fluoride ($LaF_3$), samarium fluoride ($SmF_3$), barium fluoride ($BaF_2$), calcium fluoride ($CaF_2$), lithium fluoride (LiF), low-refractive organic monomers and/or low-refractive organic polymers;

or at least one high-refractive dielectric material with a refractive index greater than 1.65, the spacing layer is selected from the group zinc sulphide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($YO_2O_3$), europium oxide ($Eu_2O_3$), iron oxides, iron (II, III) oxide ($Fe_3O_4$), and iron (III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), Silicon monoxide (SiO), selenium trioxide ($Se_2O_3$), tin oxide ($SnO_2$), tungsten trioxide ($WO_3$), high-refractive organic monomers and/or high-refractive organic polymers.

13. The security element according to claim 9, characterized in that the at least one reflection layer comprises or is manufactured from:

at least one or more metallic materials selected from the group silver, copper, aluminium, gold, platinum, niobium, tin or from nickel, titanium, vanadium, chromium, cobalt and palladium or alloys of these materials; or at least one high-refractive dielectric material with a refractive index greater than 1.65, the reflection layer selected from the group zinc sulphide (ZnS), zinc oxide (ZnO), titanium dioxide ($TiO_2$), carbon (C), indium oxide ($In_2O_3$), indium-tin oxide (ITO), tantalum pentoxide ($Ta_2O_5$), cerium oxide ($CeO_2$), yttrium oxide ($Y_2O_3$), europium oxide ($Eu_2O_3$), iron oxides, iron (II,III) oxide ($Fe_3O_4$) and iron (III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon carbide (SiC), silicon nitride ($Si_3N_4$), silicon monoxide (SiO), selenium trioxide ($Se_2O_3$), tin oxide ($SnO_2$), tungsten trioxide ($WO_3$), or high-refractive organic monomers and/or high-refractive organic polymers of these materials.

14. The security element according to claim 8, characterized in that the thin-film structure has at least one reflection layer, wherein the spacing layer is arranged between the reflection layer and the absorber layer.

15. The security element according to claim 1, characterized in that the substrate is made of plastic, or a translucent and/or thermoplastic material, or comprises or is manufactured from at least one of the materials from the group polyimide (PI), polypropylene (PP), monoaxially oriented polypropylene (MOPP), biaxially oriented polypropylene (BOPP), polyethylene (PE), polyphenylene sulphide (PPS), polyether ether ketone (PEEK), polyether ketone (PEK), polyethylene imide (PEI), polysulfone (PSU), polyaryl ether ketone (PAEK), polyethylene naphthalate (PEN), liquid-crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile butadiene styrene (ABS), polyvinyl chloride (PVC), ethylene tetrafluoroethylene (ETFE), polytetrafluoroethylene (PTFE), polyvinyl fluoride (PVF), polyvinylidene fluoride (PVDF) and ethylene tetrafluoroethylene hexafluoropropylene polymer (EFEP) and/or mixtures of these materials.

16. A security element comprising:

a substrate;

a micro-image arrangement;

focusing elements; and a focusing layer, wherein the micro-image arrangement comprises at least one relief structure, wherein the micro-image arrangement is configured to generate a visible optical effect when viewed through the focusing layer, wherein the micro-image arrangement comprises at least one color-shifting layer with a color-shifting effect discernible through the focusing layer, wherein the color-shifting layer is arranged on the at least one relief structure, wherein:

the focusing elements are microlenses either embossed in an embossing lacquer layer, or are formed as a thermoplastic material; and the relief structure includes a first surface portion, a second surface portion, a thin-film structure having a reflection layer, a spacing layer and an absorber layer.

* * * * *